US009965881B2

(12) United States Patent
Ishii et al.

(10) Patent No.: US 9,965,881 B2
(45) Date of Patent: May 8, 2018

(54) METHOD FOR GENERATING IMAGE AND IMAGE GENERATION SYSTEM

(71) Applicant: Panasonic Intellectual Property Corporation of America, Torrance, CA (US)

(72) Inventors: Yasunori Ishii, Osaka (JP); Sotaro Tsukizawa, Osaka (JP); Masaki Takahashi, Osaka (JP); Reiko Hagawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days. days.

(21) Appl. No.: 15/227,315

(22) Filed: Aug. 3, 2016

(65) Prior Publication Data

US 2017/0061664 A1    Mar. 2, 2017

Related U.S. Application Data

(60) Provisional application No. 62/211,343, filed on Aug. 28, 2015.

(30) Foreign Application Priority Data

Apr. 19, 2016    (JP) .................................. 2016-083842

(51) Int. Cl.
   *G06T 11/60*    (2006.01)
(52) U.S. Cl.
   CPC .... *G06T 11/60* (2013.01); *G06T 2207/10024* (2013.01)

(58) Field of Classification Search
   USPC .......................................................... 382/284
   See application file for complete search history.

(56) References Cited

U.S. PATENT DOCUMENTS

| 2004/0228544 | A1* | 11/2004 | Endo | ..................... | G06T 3/4038 |
| | | | | | 382/284 |
| 2007/0296828 | A1* | 12/2007 | Onomura | ............... | H04N 5/232 |
| | | | | | 348/222.1 |
| 2009/0315911 | A1* | 12/2009 | Ohnishi | ................ | G06T 11/001 |
| | | | | | 345/593 |
| 2011/0262039 | A1* | 10/2011 | Du | ..................... | G06K 9/00228 |
| | | | | | 382/167 |

(Continued)

FOREIGN PATENT DOCUMENTS

JP    2014-178957    9/2014

*Primary Examiner* — Jerome Grant, II
(74) *Attorney, Agent, or Firm* — Greenblum & Bernstein, P.L.C.

(57) ABSTRACT

A method, executed by a processor of an image generation system, includes obtaining an image of a first area included in a first image and an image of a second area included in a second image, calculating a first conversion parameter for converting the image of the first area such that color information regarding the image of the first area becomes similar to color information regarding the image of the second area, converting the first image using the first conversion parameter, and generating a third image as a training image used for machine learning for image recognition by combining the converted first image and the second image with each other.

13 Claims, 10 Drawing Sheets

(56) References Cited

U.S. PATENT DOCUMENTS

| | | | |
|---|---|---|---|
| 2011/0268356 A1* | 11/2011 | Tsukada | G06T 1/00 |
| | | | 382/167 |
| 2012/0301042 A1* | 11/2012 | Komatsu | H04N 1/60 |
| | | | 382/254 |
| 2014/0010457 A1* | 1/2014 | Kuraya | G06K 9/46 |
| | | | 382/195 |
| 2014/0363062 A1* | 12/2014 | Han | G06K 9/4642 |
| | | | 382/128 |
| 2016/0016402 A1* | 1/2016 | Denda | B41J 2/21 |
| | | | 347/15 |
| 2016/0034746 A1* | 2/2016 | Harada | G06K 9/00201 |
| | | | 382/154 |
| 2016/0163028 A1* | 6/2016 | Xu | G06K 9/00234 |
| | | | 382/118 |
| 2016/0163066 A1* | 6/2016 | Ishihara | G06K 9/00234 |
| | | | 382/162 |
| 2017/0061644 A1* | 3/2017 | Pham | G06K 9/00 |
| 2017/0099445 A1* | 4/2017 | Manabe | H04N 5/357 |
| 2017/0171481 A1* | 6/2017 | Honda | H04N 5/3696 |
| 2017/0196532 A1* | 7/2017 | Choi | A61B 8/00 |
| 2017/0251128 A1* | 8/2017 | Horita | H04N 1/6019 |
| 2017/0251129 A1* | 8/2017 | Sakatani | H04N 1/6044 |

* cited by examiner

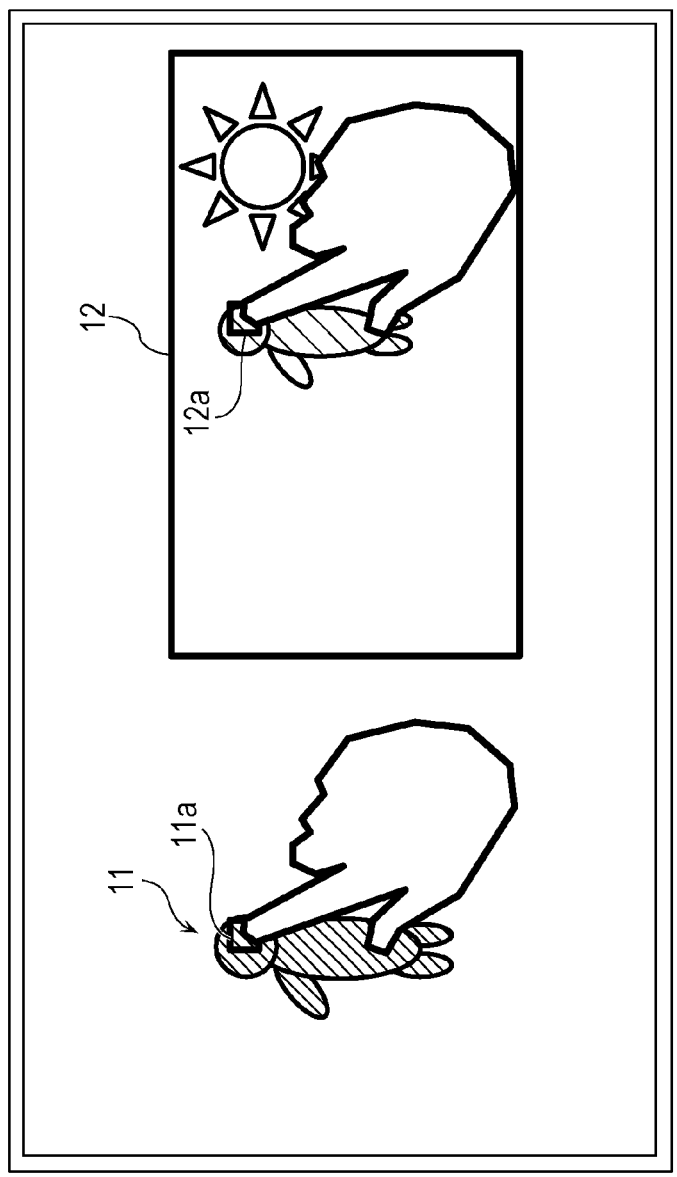

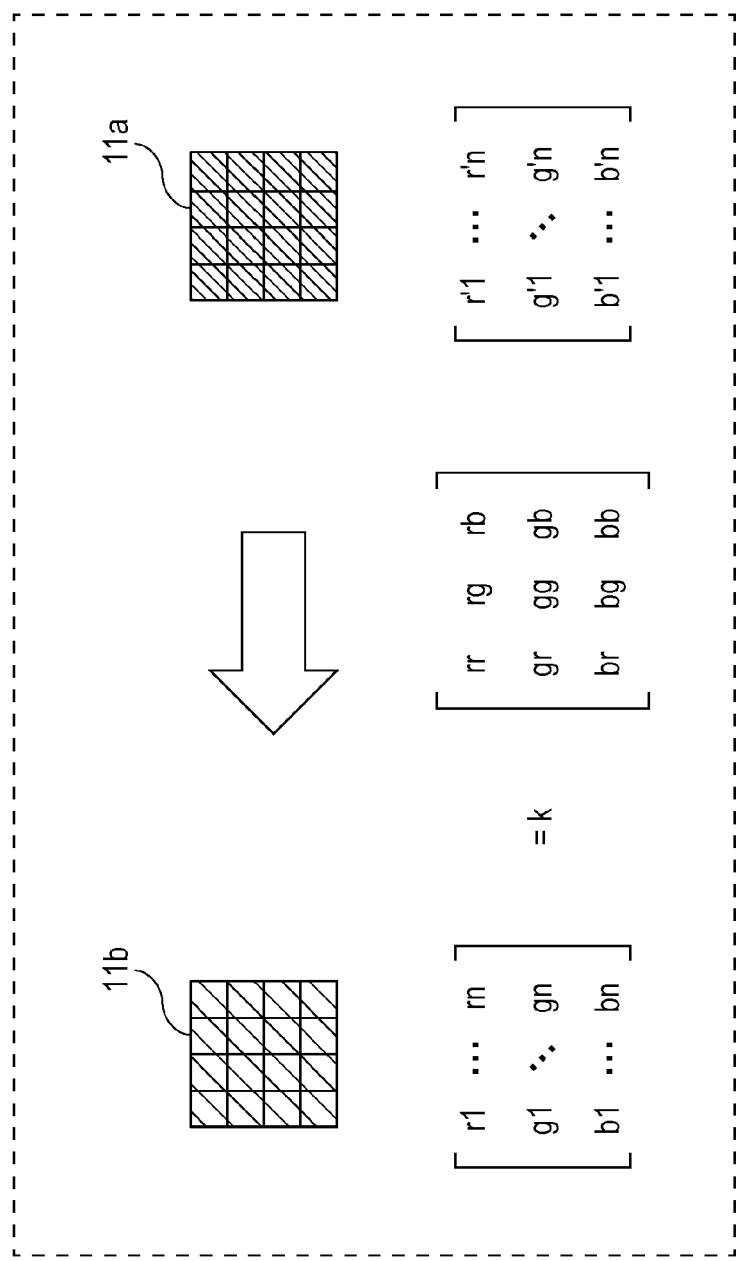

METHOD FOR GENERATING IMAGE AND IMAGE GENERATION SYSTEM

BACKGROUND

1. Technical Field

The present disclosure relates to a method for generating an image and an image generation system that generate training images used for machine learning for image recognition.

2. Description of the Related Art

Machine learning might be used for image recognition. If deep learning is used as the machine learning for image recognition, a large amount of training data is required.

A method for generating a large amount of training data is disclosed in Japanese Unexamined Patent Application Publication No. 2014-178957. In Japanese Unexamined Patent Application Publication No. 2014-178957, first, a plurality of images of an object are captured while changing image capture conditions. An object area is then extracted from each of the plurality of images of the object using a plurality of images of the object captured under different image capture conditions. A new training image can then be generated by combining an image of the extracted object area with a background image.

SUMMARY

In one general aspect, the techniques disclosed here feature a method executed by a processor of an image generation system. The method includes obtaining an image of a first area included in a first image and an image of a second area included in a second image, calculating a first conversion parameter for converting the image of the first area such that color information regarding the image of the first area becomes similar to color information regarding the image of the second area, converting the first image using the first conversion parameter, and generating a third image as a training image used for machine learning for image recognition by combining the converted first image and the second image with each other.

According to the method for generating an image according to the aspect of the present disclosure, training images suitable for machine learning for image recognition can be generated by a simple method using images whose image capture conditions are unknown.

It should be noted that general or specific embodiments may be implemented as a system, an apparatus, an integrated circuit, a computer program, a storage medium such as a computer-readable compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of specification of the first area and the second area according to the first embodiment;

FIG. 5 is a diagram illustrating calculation of a conversion table according to the first embodiment;

DETAILED DESCRIPTION

Figure 1:
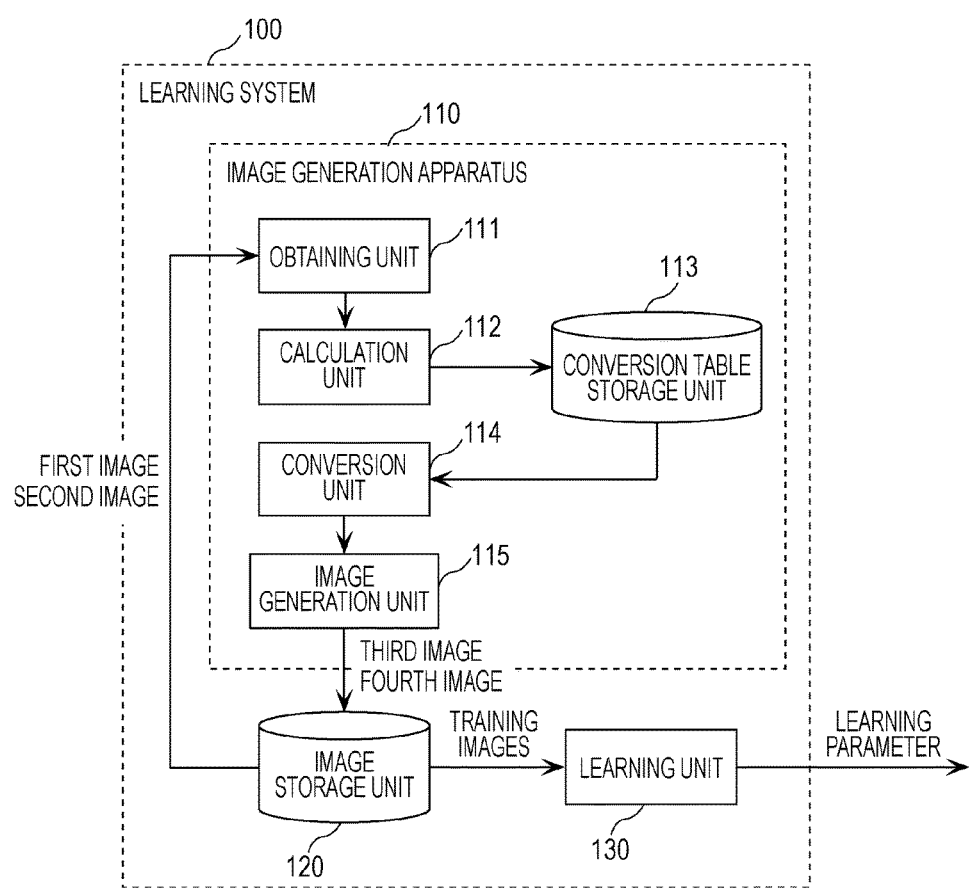
FIG. 1 is a block diagram illustrating a learning system according to a first embodiment.

Underlying Knowledge Forming Basis of the Present Disclosure

Since image capture conditions are employed, the above example of the related art is applied only to images whose image capture conditions are known. It is therefore difficult, for example, to generate training images using images on the Internet whose image capture conditions are unknown.

The present disclosure provides a method for generating an image and an image generation system capable of generating training images used for machine learning for image recognition by a simple method using images whose image capture conditions are unknown.

Overview of the Present Disclosure

A method according to an aspect of the present disclosure is a method executed by a processor of an image generation system. The method includes obtaining an image of a first area included in a first image and an image of a second area included in a second image, calculating a first conversion parameter for converting the image of the first area such that color information regarding the image of the first area becomes similar to color information regarding the image of the second area, converting the first image using the first conversion parameter, and generating a third image as a training image used for machine learning for image recognition by combining the converted first image and the second image with each other.

According to this, a training image can be generated by combining the first image converted using the first conversion parameter and the second image with each other. The first conversion parameter is a parameter for converting the image of the first area such that the color information regarding the image of the first area becomes similar to the color information regarding the image of the second area. As a result, it becomes possible to suppress generation of unnatural colors are as a result of the combination of the two images and generate a natural image suitable as a training image for machine learning for image recognition. That is, the third image can be generated as a training image suitable for machine learning for image recognition by a simple method using images whose image capture conditions are unknown.

For example, the method may further include obtaining an error value on the basis of similarity between the color information regarding the image of the first area converted using the first conversion parameter and the color information regarding the image of the second area, wherein, in the generating, if the error value is smaller than a certain threshold, the third image may be generated by combining the first image which is converted using the first conversion parameter and the second image with each other.

According to this, if the error value of the color information regarding the image of the first area converted using the first conversion parameter is equal to or larger than the certain threshold, the third image is not generated by combining the first image which is converted using the first conversion parameter and the second image with each other. As a result, when it is difficult to make the color information regarding the image of the first area similar to the color information regarding the image of the second area, it is possible to prevent generation of an unnatural training image as a result of the combination.

For example, the method may further include reducing, if the error value is equal to or larger than the certain threshold, sizes of the first area and the second area, obtaining the image of the reduced first area and the image of the reduced second area, calculating a second conversion parameter for converting the image of the reduced first area such that the color information regarding the image of the reduced first area becomes similar to the color information regarding the image of the reduced second area, and converting the first image using the second conversion parameter, wherein, in the generating, the third image may be generated by combining the converted first image using the second conversion parameter and the second image with each other, if the error value is equal to or larger than the certain threshold.

According to this, if the error value of the color information regarding the image of the first area converted using the first conversion parameter is equal to or larger than the certain threshold, the sizes of the first area and the second area can be reduced, and the conversion parameter can be recalculated. When the first area and the second area are small, it is easy to make the color information regarding the images of the two areas similar to each other, but it becomes more likely to calculate an inappropriate conversion parameter due to an effect of local color information. By reducing the size of the first area and the second area in accordance with the error value, therefore, it becomes possible to make the color information regarding the images of the two areas similar to each other while suppressing excessive reduction of the sizes of the first area and the second area. As a result, an appropriate conversion parameter can be calculated, and it becomes possible to suppress generation of an unnatural training image as a result of the combination.

For example, the error value may be an average of differences in pixel values between pixels included in the first area converted using the first conversion parameter and corresponding pixels included in the second areas. The certain threshold may become smaller as the sizes of the first area and the second area become smaller.

According to this, a threshold according to the sizes of the first area and the second area can be used. As described above, when the first area and the second area are small, it is easy to make the color information regarding the images of the two areas similar to each other. The threshold, therefore, can be changed in accordance with this characteristic. As a result, it becomes possible to suppress use of an inappropriate conversion parameter for the conversion and suppress generation of an unnatural training image as a result of the combination.

For example, the first conversion parameter may be a parameter for mapping the image of the first area onto an image similar to the image of the second area.

According to this, the parameter for mapping the image of the first area onto an image similar to the image of the second area can be used as the first conversion parameter. As a result, the first image can be converted using a conversion parameter according to characteristics of the first area and the second area and a natural image can be generated compared to when the first image is converted by uniformly applying a single coefficient to the entirety of the first image.

For example, the method may further include saving the first conversion parameter and generating a fourth image, which is different from the third image, as a training image from the saved first conversion parameter, the first image, and the second image.

According to this, the fourth image, which is different from the third image, can be further generated as a training image from the saved first conversion parameter, the first image, and the second image. As a result, more training images can be generated.

For example, a position or size of the converted image of the first area in the fourth image may be different from a position or size of the converted image of the first area in the third image.

According to this, the third image and the fourth image, in which the position or size of the image of the first area is different, can be generated as training images. As a result, variation of training images increases, and a plurality of training images suitable for machine learning for image recognition can be generated.

For example, the color information may be information regarding at least any of intensity, hue, color differences, and saturation.

According to this, the information regarding at least any of intensity, hue, color differences, and saturation can be used as the color information, and a training image suitable for machine learning for image recognition can be generated by a simple method using images whose image capture conditions are unknown.

For example, the method may further include receiving specification of the first area and the second area from a user.

According to this, the specification of the first area in the first image and the second area in the second image can be received from the user. As a result, the user can specify appropriate areas as the first area and the second area, thereby generating a training image according to the user's intention.

For example, the method may further include automatically determining the first area and the second area.

According to this, the first area in the first image and the second area in the second image can be automatically determined. As a result, a burden on the user can be reduced.

For example, in the automatically determining the first area and the second area, person recognition may be performed in the first image and the second image and person areas in the first image and the second image may be determined as the first area and the second area, respectively.

According to this, the person areas can be automatically determined as the first area and the second area. As a result, areas in which colors of subjects area are similar to each other can be determined as the first area and the second area while reducing the burden on the user and calculating an appropriate conversion parameter.

For example, the third image may be generated by superimposing the converted first image upon the second image.

According to this, the third image (training image) can be generated by superimposing the converted first image upon the second image.

A method according to an aspect of the present disclosure is a method executed by a processor of an image generation system. The method includes obtaining images of a plurality of first areas included in the first image and images of a plurality of second areas included in the second image, calculating a conversion parameter for converting each of the images of the plurality of first areas such that color information regarding each of the images of the plurality of first areas becomes similar to color information regarding a corresponding one of the images of the plurality of second areas, obtaining the first conversion parameter on the basis of the calculated plurality of conversion parameters, converting the first image using the first conversion parameter, and generating a third image as a training image used for machine learning for image recognition by combining the converted first image and the second image with each other.

According to this, the first conversion parameter can be obtained on the basis of pairs of the plurality of first areas and the plurality of second areas. As a result, it becomes possible to suppress conversion of the first image using an inappropriate conversion parameter and generation of an unnatural training image as a result of the combination.

For example, the first conversion parameter may be a descriptive statistic of the calculated plurality of conversion parameters.

According to this, the descriptive statistic of the plurality of conversion parameters can be used as the first conversion parameter. As a result, it becomes possible to suppress conversion of the first image using an inappropriate conversion parameter and generation of an unnatural training image as a result of the combination.

It should be noted that general or specific embodiments may be implemented as a system, an apparatus, an integrated circuit, a computer program, a storage medium, or any selective combination thereof.

Embodiments will be specifically described hereinafter with reference to the drawings.

The following embodiments are general or specific examples. Values, shapes, materials, components, arrangement positions and connection modes of the components, steps, the order of steps, and the like are examples, and do not limit the claims. Among the components described in the following embodiments, ones not described in the independent claims, which define broadest concepts, will be described as arbitrary components.

First Embodiment

Configuration of Learning System

FIG. 1 is a block diagram illustrating a learning system according to a first embodiment. A learning system 100 performs machine learning for image recognition. The image recognition refers to object recognition and is a technique for recognizing, for example, persons, persons' faces, letters, and the like in images.

As illustrated in FIG. 1, the learning system 100 includes an image generation apparatus 110, an image storage unit 120, and a learning unit 130.

The image generation apparatus 110 is an example of an image generation system that generates training images used for machine learning for image recognition. The image generation apparatus 110, for example, includes a processor and a non-transitory memory storing a program, and the program causes the processor to perform a process for generating an image. More specifically, the program causes the image generation apparatus 110 to function as an obtaining unit 111, a calculation unit 112, a conversion table storage unit 113, a conversion unit 114, and an image generation unit 115 described below. Alternatively, for example, the image generation apparatus 110 may be achieved by dedicated hardware.

The image generation apparatus 110 includes the obtaining unit 111, the calculation unit 112, the conversion table storage unit 113, the conversion unit 114, and the image generation unit 115.

The obtaining unit 111 obtains an image of a first area included in a first image and an image of a second area included in a second image. The first and second areas, for example, are areas having the same size in which colors of subjects are similar to each other. Colors of the images of the first and second areas are preferably uniform.

The obtaining unit 111, for example, receives specification of the first and second areas from a user. More specifically, for example, the obtaining unit 111 is achieved by a touch screen and determines, as the first and second areas, areas in the first and second images touched by the user on a screen on which the first and second images are displayed. The obtaining unit 111 then extracts images of the determined first and second areas from the first and second images, respectively.

Alternatively, for example, the obtaining unit 111 may automatically determine the first and second areas without specification from the user. For example, the obtaining unit 111 may perform person recognition in the first and second images and determine person areas in the first and second areas as the first and second areas, respectively. In this case, the person areas can be automatically determined as the first and second areas. Since areas in which colors of subjects are similar to each other can be determined as the first and second areas, a burden on the user can be reduced, and an appropriate conversion table can be calculated.

The calculation unit 112 calculates a conversion table used for converting the image of the first area such that color information regarding the image of the first area becomes similar to color information regarding the image of the second area. The conversion table is an example of a first conversion parameter, and, for example, is a parameter for mapping the image of the first area onto the image of the second area.

Color information is information regarding at least any of intensity, hue, color differences, and saturation. In the present embodiment, color information is red, green, and blue (RGB) intensity values of each pixel included in an image represented by an RGB color model.

The conversion table storage unit 113 stores the conversion table calculated by the calculation unit 112. The conversion table storage unit 113, for example, is a hard disk drive or a semiconductor memory.

The conversion unit 114 converts the first image using the conversion table calculated by the calculation unit 112. More specifically, the conversion unit 114 obtains the conversion table from the conversion table storage unit 113 and converts the first image using the obtained conversion table.

As a result, the image of the first area in the converted first image becomes similar to the image of the second area in the second image.

The image generation unit 115 generates a third image and a fourth image by combining the converted first image and the second image with each other. The image generation unit 115 generates the third and fourth images, for example, by superimposing the first image upon the second image. More specifically, when the width and height of the first image are denoted by (width, height) and certain coordinates in the second image are denoted by (x, y), the image generation unit 115 superimposes the first image upon the second image such that (x, y) in the second image matches upper-left coordinates of the first image. The image generation unit 115 then replaces pixel values of the second image with pixel values of the first image in an area from (x, y) to (x+width, y+height). The third and fourth images are stored in the image storage unit 120 as training images for machine learning.

The fourth image is different from the third image. More specifically, a position or the size of the converted first image in the fourth image is different from a position or the size of the converted first image in the third image. More specifically, when the width and height of the first image are denoted by (width, height), the first image is converted into an image whose width and height are n and m times larger than those of the first image, respectively (width×n, height×m). The image obtained as a result of the conversion (fifth image) is superimposed upon the second image such that upper-left coordinates of the fifth image comes to a position (x', y') different from the position (x, y) at which the second image has been superimposed upon the first image to generate the third image. The image generation unit 115 then replaces pixel values of the second image with pixel values of the fifth image in an area from (x', y') to (x'+width×n, y'+height×m). When the pixel values of the second image are replaced with the pixel values of the first and fifth images in order to generate the third and fourth images, respectively, only pixel values inside the second image are replaced.

The image storage unit 120 stores training images for machine learning, including the first, second, third, and fourth images. The image storage unit 120, for example, is a hard disk drive or a semiconductor memory.

The learning unit 130 obtains a learning parameter for image recognition by performing machine learning on the basis of the training images stored in the image storage unit 120. A method used for machine learning is not particularly limited, but, for example, deep learning may be used.

Operation of Image Generation Apparatus

Next, the operation of the image generation apparatus 110 configured as described above will be specifically described with reference to FIGS. 2 to 6C.

Figure 2:
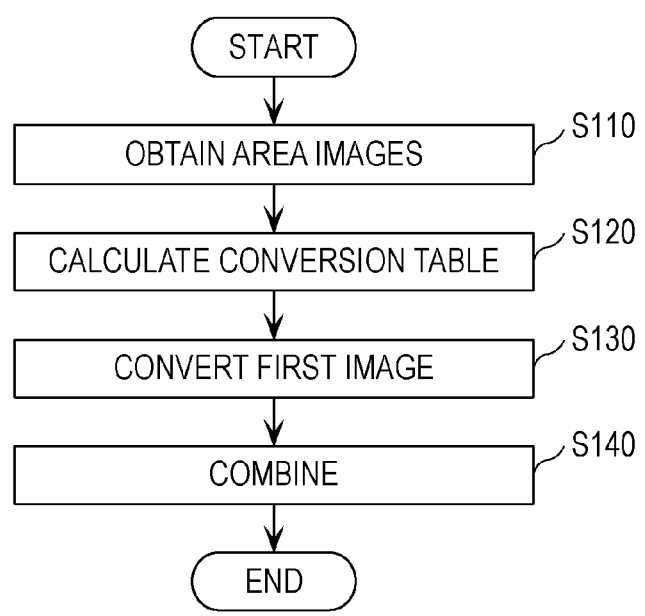
FIG. 2 is a flowchart illustrating a process performed by an image generation apparatus according to the first embodiment.
Figure 3A:
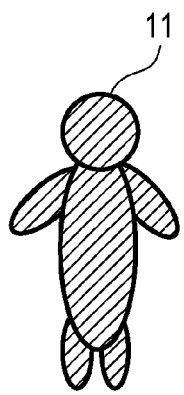
FIG. 3A is a diagram illustrating an example of a first image according to the first embodiment.
Figure 3B:
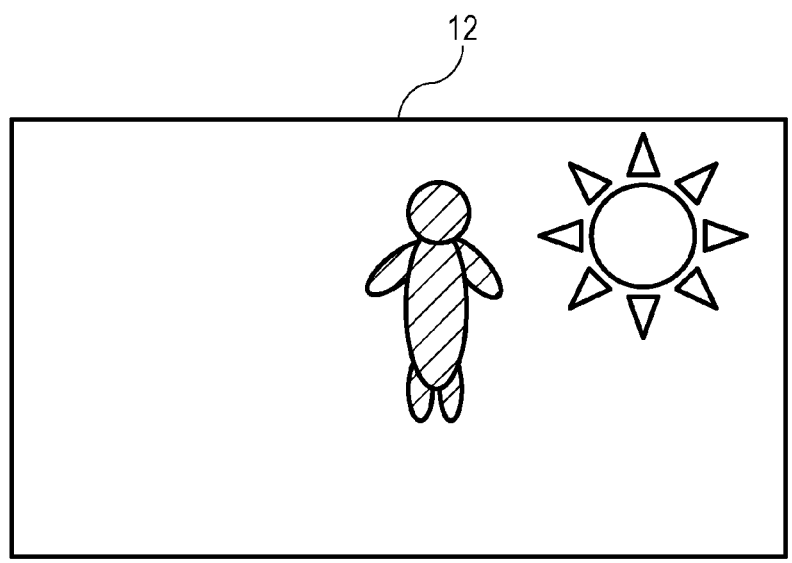
FIG. 3B is a diagram illustrating an example of a second image according to the first embodiment.

FIG. 2 is a flowchart illustrating a process performed by the image generation apparatus 110 according to the first embodiment. Here, the process will be described while taking the first and second images illustrated in FIGS. 3A and 3B, respectively, as an example. FIGS. 3A and 3B illustrate examples of the first and second images according to the first embodiment. In FIG. 3A, a first image 11 is a person image obtained by extracting a person to be subjected to image recognition. In FIG. 3B, a second image 12 includes the sun and a person exposed to sunlight.

First, the obtaining unit 111 obtains an image of a first area 11a included in the first image 11 and an image of a second area 12a included in a second image (S110). Here, the obtaining unit 111 receives specification of the first area 11a and the second area 12a from the user. More specifically, as illustrated in FIG. 4, for example, the obtaining unit 111 determines areas in the first image 11 and the second image 12 touched by the user on a screen on which the first image 11 and the second image 12 are displayed as the first area 11a and the second area 12a, respectively. Here, the first area 11a and the second area 12a are areas of flesh color in the persons' faces. The obtaining unit 111 then extracts the images of the first area 11a and the second area 12a from the first image 11 and the second image 12, respectively.

Next, the calculation unit 112 calculates a conversion table for converting the image of the first area 11a such that color information regarding the image of the first area 11a becomes similar to color information regarding the image of the second area 12a, and stores the calculated conversion table in the conversion table storage unit 113 (S120). As illustrated in FIG. 5, for example, the calculation unit 112 calculates a conversion table T based on the following expression 1 on the basis of similarity between color information, which is calculated using expression 1, regarding an image of a first area 11b obtained as a result of the conversion and the color information regarding the image of the second area 12a. More specifically, for example, the calculation unit 112 searches for the conversion table T with which an error between the color information regarding the image of the first area 11b and the color information regarding the second area 12a becomes smallest using a conventional algorithm for finding an approximate solution.

[Math. 1]

$$\begin{bmatrix} r1 & \ldots & rn \\ g1 & \ddots & gn \\ b1 & \ldots & bn \end{bmatrix} = T \begin{bmatrix} r'1 & \ldots & r'n \\ g'1 & \ddots & g'n \\ b'1 & \ldots & b'n \end{bmatrix} \quad (1)$$

$$T = k \begin{bmatrix} rr & rg & rb \\ gr & gg & gb \\ br & bg & bb \end{bmatrix}$$

Here, r'i, g'i, and b'i denote RGB intensity values of an i-th (i=1 to n) pixel in the first area 11a. n is a total number of pixels included in the first area 11a. ri, gi, and bi denote RGB intensity values of an i-th pixel in the first area 11b obtained as a result of the conversion.

T denotes the conversion table (conversion parameter) used for mapping the image of the first area 11a onto an image similar to the image of the second area 12a. k denotes a proportionality constant.

Next, the conversion unit 114 converts the first image 11 using the conversion table T calculated by the calculation unit 112 (S130). That is, the conversion unit 114 applies the conversion table T calculated from the first area 11a to the entirety of the first image 11 including the first area 11a.

Finally, the image generation unit 115 superimposes first images 11A and 11B obtained as a result of the conversion upon the second image 12 to generate a third image 13 and a fourth image 14 (S140). The image generation unit 115 generates, for example, the third image 13 and the fourth image 14 including the first images 11A and 11B, respectively, as foreground images and the second image 12 as a background image.

Figure 6A:
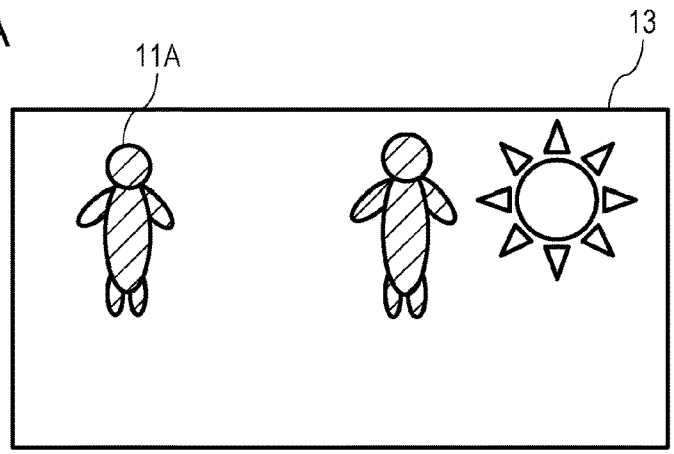
FIG. 6A is a diagram illustrating an example of a third image according to the first embodiment.
Figure 6B:
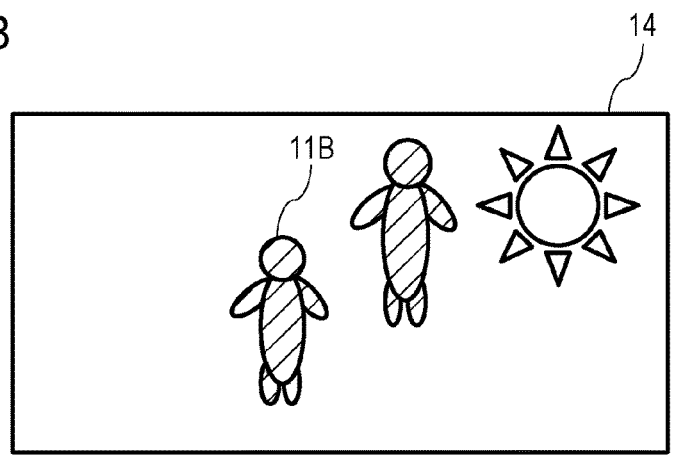
FIG. 6B is a diagram illustrating an example of a fourth image according to the first embodiment.
Figure 6C:
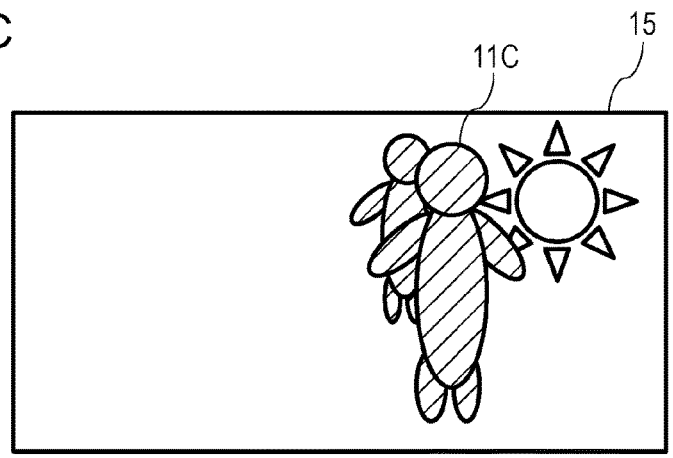
FIG. 6C is a diagram illustrating another example of the fourth image according to the first embodiment.

FIGS. 6A and 6B illustrate examples of the third image 13 and the fourth image 14, respectively, according to the first embodiment. FIG. 6C illustrates another example of the fourth image 14 (fourth image 15) according to the first embodiment. As illustrated in FIGS. 6A to 6C, a position or the size of the first image 11B or a first image 110 in the fourth image 14 or 15 is different from a position or the size of the first image 11A in the third image 13.

Advantageous Effects

As described above, according to the image generation apparatus 110 according to the present embodiment, a training image can be generated by combining the first image 11 converted using the conversion table T and the second image 12 with each other. The conversion table T is a table for converting the image of the first area 11a such that the color information regarding the image of the first area 11a becomes similar to the color information regarding the image of the second area 12a. As a result, it becomes possible to suppress generation of unnatural colors as a result of the combination of the two images and generate a natural image suitable as a training image for machine learning for image recognition. That is, a training image suitable for machine learning for image recognition can be generated by a simple method using images whose image capture conditions are unknown.

In addition, according to the image generation apparatus 110 according to the present embodiment, a table for mapping the image of the first area 11a onto an image similar to the image of the second area 12a can be used as the conversion table T. Since the first image 11 is converted using the conversion table T according to characteristics of the images of the first area 11a and the second area 12a, a natural training image can be generated compared to when the first image 11 is converted by uniformly applying a single coefficient to the entirety of the first image 11.

In addition, according to the image generation apparatus 110 according to the present embodiment, the fourth image 14, which is different from the third image 13, can be generated from the saved conversion table T, the first image 11, and the second image 12. As a result, more training images can be generated.

In addition, according to the image generation apparatus 110 according to the present embodiment, the third image 13 and the fourth image 14, in which the position or size of the image of the first area 11a is different, can be generated as training images. As a result, variation of training images increases, and a plurality of training images suitable for machine learning for image recognition can be generated.

In addition, according to the image generation apparatus 110 according to the present embodiment, intensity information can be used as color information, and training images suitable for machine learning for image recognition can be generated by a simple method using images whose image capture conditions are unknown.

In addition, according to the image generation apparatus 110 according to the present embodiment, specification of the first area 11a in the first image 11 and the second area 12a in the second image 12 can be received from the user. As a result, the user can specify appropriate areas as the first area 11a and the second area 12a, thereby generating intended training images.

Second Embodiment

Next, a second embodiment will be described. The present embodiment is different from the first embodiment mainly in that the size of the first area obtained as a result of the conversion and the second area is reduced if the error between the image of the first area and the image of the second area is large. Differences between the present embodiment and the first embodiment will be mainly described hereinafter.

Configuration of Learning System

Figure 7:
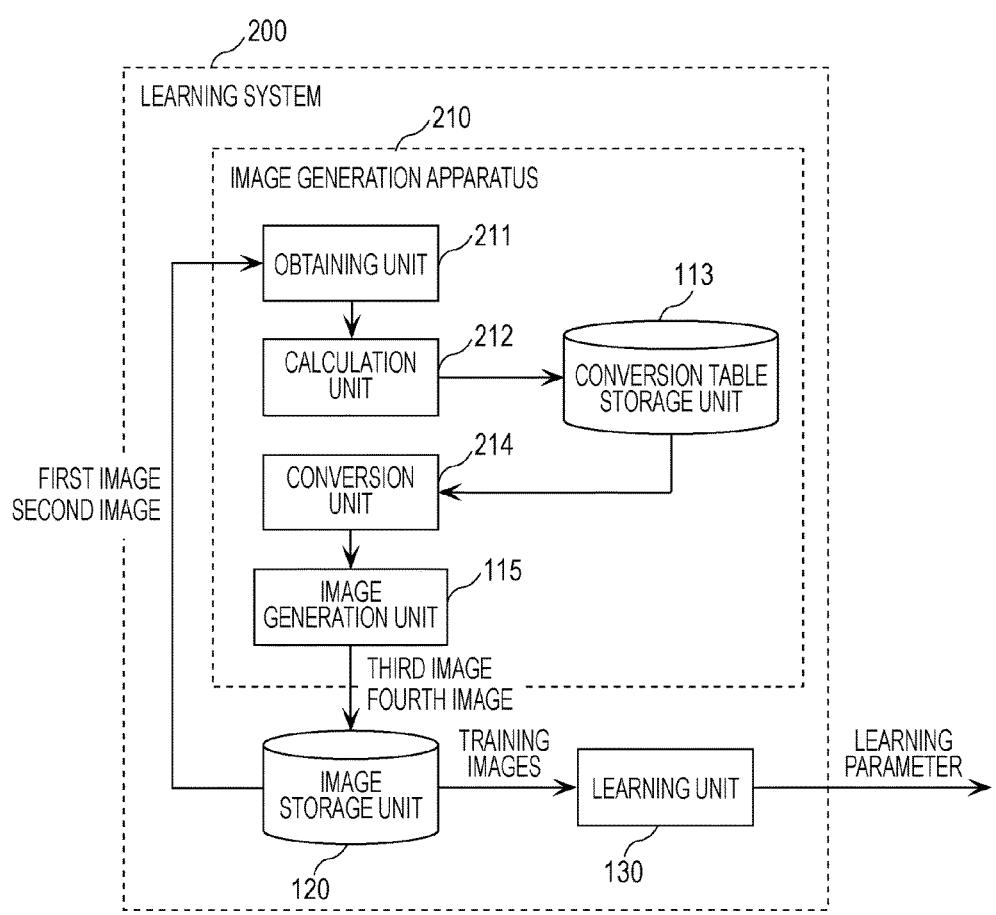
FIG. 7 is a block diagram illustrating a learning system according to a second embodiment.

FIG. 7 is a block diagram illustrating the configuration of a learning system according to the second embodiment. In FIG. 7, substantially the same components as in FIG. 1 are given the same reference numerals, and detailed description thereof is omitted.

A learning system 200 according to the present embodiment includes an image generation apparatus 210, the image storage unit 120, and the learning unit 130.

The image generation apparatus 210 is an example of an image generation system that generates training images used for machine learning for image recognition. The image generation apparatus 210 includes an obtaining unit 211, a calculation unit 212, the conversion table storage unit 113, a conversion unit 214, and the image generation unit 115.

As with the calculation unit 112 according to the first embodiment, the calculation unit 212 calculates a conversion table for converting the image of the first area 11a such that the color information regarding the image of the first area 11a becomes similar to the color information regarding the image of the second area 12a. The calculation unit 212 then calculates an error value based on the similarity between the color information regarding the image of the first area 11a converted using the calculated conversion table and the color information regarding the image of the second area 12a. The error value is an average of differences between pixel values of the pixels included in the converted first area 11a and pixel values of corresponding pixels included in the second area 12a and, for example, a mean absolute difference or a mean square difference. When the differences between the pixel values of the pixels are obtained and averaged, the error value becomes large if there are significant differences between the pixel values, and the error value becomes small if the differences between the pixel values are not large as a whole. As a result, an error value insusceptible to noise can be calculated.

If the error value is smaller than a certain threshold, the image generation unit 115 generates a third image and a fourth image by combining the first image, which is converted using the first conversion parameter, and the second image with each other. That is, as with the conversion unit 114 according to the first embodiment, the conversion unit 214 converts the first image 11 using the calculated conversion table.

The certain threshold may be predetermined empirically or experimentally. The certain threshold, for example, may become smaller as the size of the first area 11a and the second area 12a becomes smaller. In this case, for example, the conversion unit 214 may obtain a threshold corresponding to the size of the first area 11a and the second area 12a from the conversion table storage unit 113 storing a plurality of thresholds corresponding to a plurality of sizes.

If the error value is equal to or larger than the certain threshold, the obtaining unit 211 reduces the sizes of the first area 11a and the second area 12a respectively. The obtaining unit 211 then obtains the images of the first area 11a and the second area 12a whose size has been reduced. The calculation unit 212 calculates a new conversion table for converting the image of the reduced first area 11a such that the color information regarding the image of the reduced first area 11a becomes similar to the color information regarding the image of the reduced second area 12a. The new conversion table is an example of a second conversion parameter. The conversion unit 214 converts the first image 11 using the calculated new conversion table. If the error value is equal to or larger than the certain threshold, the image generation unit 115 generates a third image and a fourth image by combining the first image, which is converted using the second conversion parameter, and the second image with each other.

The first area 11a and the second area 12a might not necessarily be included in an area of a target object. By using the reduced first area 11a and the reduced second area 12a, therefore, a possibility of obtaining pixel values from an unintended object that can exist at an edge of the area can be reduced, thereby reducing pixels at a time when the conversion table is calculated.

Operation of Image Generation Apparatus

Figure 8:
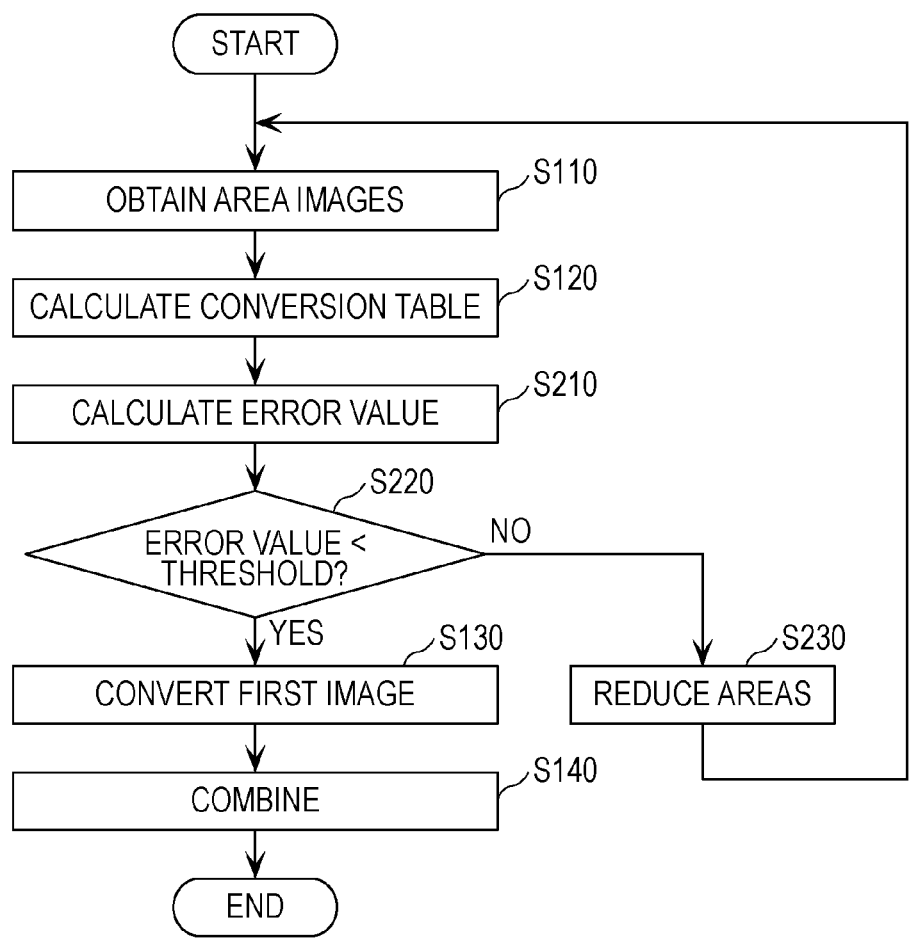
FIG. 8 is a flowchart illustrating a process performed by an image generation apparatus according to the second embodiment.

Next, the operation of the image generation apparatus 210 configured as described above will be specifically described with reference to FIG. 8. FIG. 8 is a flowchart illustrating a process performed by the image generation apparatus 210 according to the second embodiment. In FIG. 8, substantially the same steps as in FIG. 2 are given the same reference numerals, and detailed description thereof is omitted.

After the conversion table is calculated (S120), the calculation unit 212 calculates an error value based on the similarity between the color information regarding the image of the first area 11a converted using the calculated conversion table and the color information regarding the image of the second area 12a (S210).

The conversion unit 214 then determines whether the error value is smaller than the threshold (S220). If the error value is smaller than the threshold (YES in S220), the conversion unit 214 converts the first image 11 using the calculated conversion table (S130). On the other hand, if the error value is equal to or larger than the threshold (NO in S220), the obtaining unit 211 reduces the sizes of the first area 11a and the second area 12a respectively (S230). The obtaining unit 211 then obtains the images of the reduced first area 11a and the reduced second area 12a (S110). The processing in steps S120 to S220 is then performed using the obtained images of the reduced first area 11a and the reduced second area 12a.

Advantageous Effects

As described above, according to the image generation apparatus 210 according to the present embodiment, if the error value of the color information regarding the image of the first area 11a converted using the conversion table is equal to or larger than the certain threshold, the conversion of the first image 11 is inhibited. When it is difficult to make the color information regarding the image of the first area 11a similar to the color information regarding the image of the second area 12a, therefore, it is possible to prevent generation of unnatural training images as a result of the combination of the two images.

In addition, according to the image generation apparatus 210 according to the present embodiment, if the error value of the color information regarding the image of the first area 11a converted using the conversion table is equal to or larger than the certain threshold, the sizes of the first area 11a and the second area 12a are reduced respectively, and the conversion table can be recalculated. When the first area 11a and the second area 12a are small, it is easy to make the color information regarding the image of the two areas similar to each other, but it becomes more likely to calculate an inappropriate conversion table due to an effect of local color information. By reducing the sizes of the first area 11a and the second area 12a in accordance with the error value, therefore, it becomes possible to make the color information regarding the images of the two areas similar to each other while suppressing excessive reduction of the sizes of the first area 11a and the second area 12a. As a result, an appropriate conversion table can be calculated, and it becomes possible to suppress generation of unnatural training images as a result of the combination.

In addition, according to the image generation apparatus 210 according to the present embodiment, a threshold according to the size of the first area 11a and the second area 12a can be used. As described above, when the first area 11a and the second area 12a are small, it is easy to make the color information regarding the images of the two areas similar to each other, and the threshold can be changed in accordance with this characteristic. As a result, it becomes possible to suppress use of an inappropriate conversion table for the conversion and generation of unnatural training images as a result of the combination.

Third Embodiment

Next, a third embodiment will be described. The present embodiment is different from the first embodiment mainly in that a conversion table is calculated from a plurality of first areas and a plurality of second areas. Differences between the present embodiment and the first embodiment will be mainly described hereinafter.

Configuration of Learning System

Figure 9:
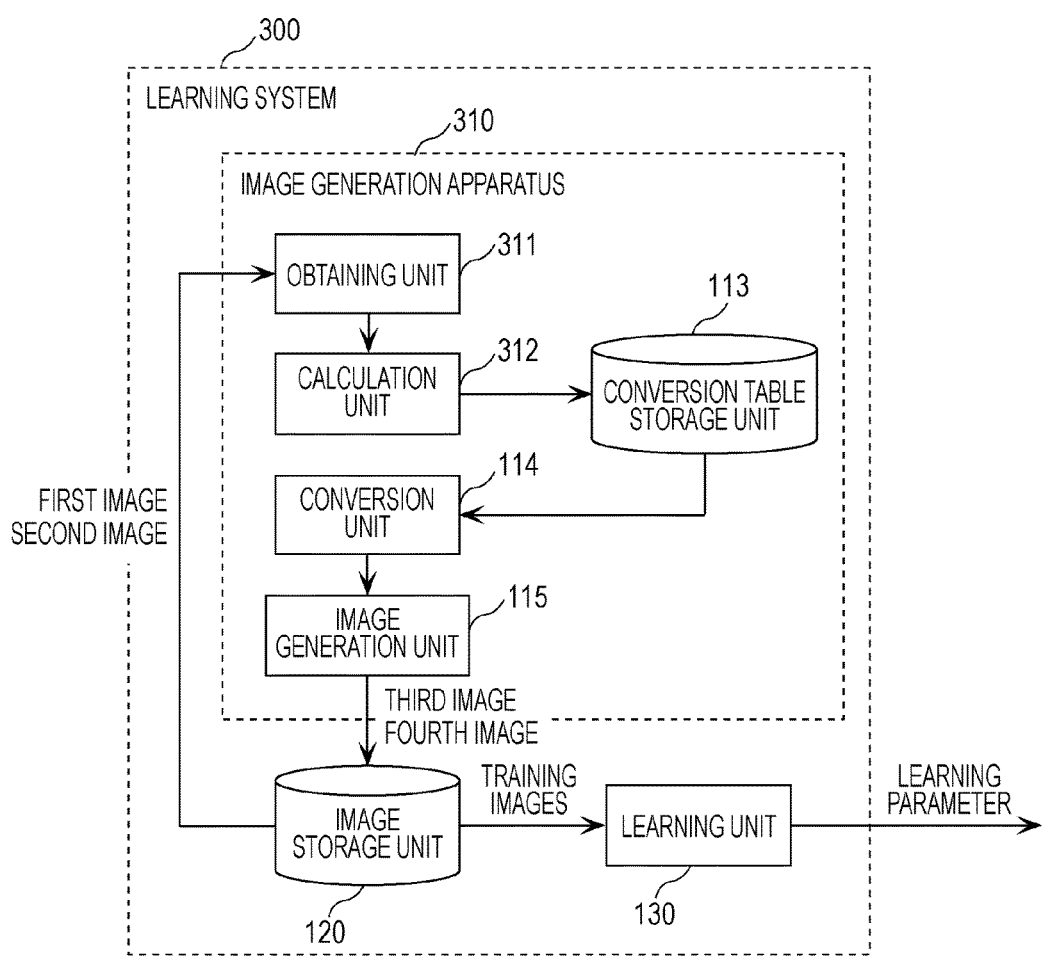
FIG. 9 is a block diagram illustrating a learning system according to a third embodiment.

FIG. 9 is a block diagram illustrating the configuration of a learning system according to the third embodiment. In FIG. 9, substantially the same components as in FIG. 1 are given the same reference numerals, and detailed description thereof is omitted.

A learning system 300 according to the present embodiment includes an image generation apparatus 310, the image storage unit 120, and the learning unit 130.

The image generation apparatus 310 is an example of an image generation system that generates training images used for machine learning for image recognition. The image generation apparatus 310 includes an obtaining unit 311, a calculation unit 312, the conversion table storage unit 113, the conversion unit 114, and the image generation unit 115.

The obtaining unit 311 obtains images of a plurality of first areas included in the first image 11 and images of a plurality of second areas included in the second image 12. The plurality of first areas and the plurality of second areas may be specified by the user or automatically determined by the obtaining unit 311.

The calculation unit 312 calculates a conversion table for converting each of the images of the plurality of first areas such that color information regarding each of the images of the plurality of first areas becomes similar to color information regarding a corresponding one of the images of the plurality of second areas. That is, the calculation unit 312 calculates a conversion table for each of a plurality of pairs of the images of the plurality of first areas and the images of the plurality of second areas.

The calculation unit 312 obtains a representative conversion table on the basis of the plurality of conversion tables calculated in this manner and stores the obtained representative conversion table in the conversion table storage unit 113. The representative conversion table may be one of the plurality of conversion tables or may be a descriptive statistic of the plurality of conversion tables. The descriptive statistic is, for example, an average, a median, or a mode. When a difference in color between the images does not significantly vary between areas, the conversion tables become similar to each other, and a descriptive statistic can be obtained. When variation between the conversion tables for the entirety of the images has a Gaussian distribution, there are few significant outliers, and a suitable conversion table representing the plurality of conversion tables can be obtained using an average. When one of the conversion tables is significantly different from the others, for example, a representative conversion table robust to an outlier can be selected using a median. When the conversion tables are similar to one another in most of the images, a representative conversion table insusceptible to outliers can be selected using a mode. As described above, a representative conversion table suitable for images used can be selected using a different method for selecting a representative conversion table in accordance with the similarity between conversion tables.

Operation of Image Generation Apparatus

Figure 10:
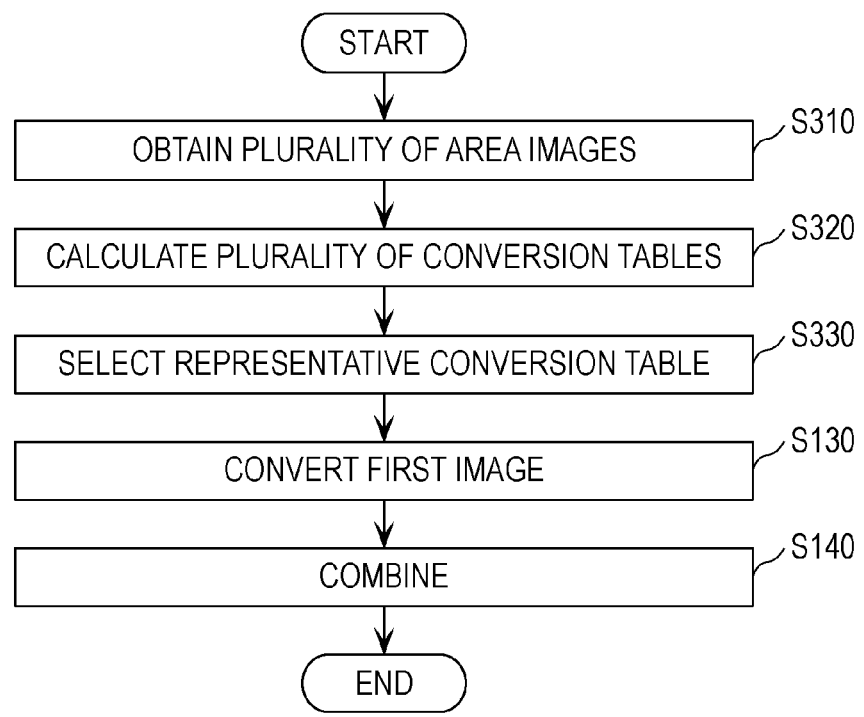
FIG. 10 is a flowchart illustrating a process performed by an image generation apparatus according to the third embodiment.

Next, the operation of the image generation apparatus 310 configured as described above will be specifically described with reference to FIG. 10. FIG. 10 is a flowchart illustrating a process performed by the image generation apparatus 310 according to the third embodiment. In FIG. 10, substantially the same steps as in FIG. 2 are given the same reference numerals, and detailed description thereof is omitted.

First, the obtaining unit 311 obtains images of a plurality of first areas included in the first image 11 and images of a plurality of second areas included in the second image 12 (S310).

Next, the calculation unit 312 calculates a conversion table for converting each of the images of the plurality of first areas such that color information regarding each of the images of the plurality of first areas becomes similar to color information regarding a corresponding one of the images of the plurality of second areas (S320).

The calculation unit 312 obtains a representative conversion table on the basis of the plurality of conversion tables calculated in this manner (S330). For example, the calculation unit 312 selects a conversion table whose error value according to the second embodiment is smallest among the plurality of conversion tables as a representative conversion table.

Alternatively, for example, the calculation unit 312 may select a representative conversion table from the plurality of conversion tables on the basis of characteristics of the images of the plurality of first areas and the images of the plurality of second areas. More specifically, for example, the calculation unit 312 may select a conversion table calculated from a most flat image (an image whose color is uniform) among the images of the plurality of first areas and the images of the plurality of second areas as a representative conversion table.

Alternatively, for example, the calculation unit 312 may obtain a descriptive statistic of the plurality of conversion tables as a representative conversion table. For example, the calculation unit 312 may obtain a conversion table having an average of elements included in the plurality of conversion tables as a representative conversion table.

The conversion unit 114 converts the first image using the representative conversion table obtained in this manner (S130).

Advantageous Effects

As described above, according to the image generation apparatus 310 according to the present embodiment, a conversion table can be obtained on the basis of the pairs of the plurality of first areas 11a and the plurality of second areas 12a. As a result, it becomes possible to suppress conversion of the first image 11 using an inappropriate conversion table and generation of unnatural training images as a result of the combination.

In addition, according to the image generation apparatus 310 according to the present embodiment, a descriptive statistic of a plurality of conversion tables can be used as a conversion table. As a result, it becomes possible to suppress conversion of the first image 11 using an inappropriate conversion table and generation of unnatural training images as a result of the combination.

Other Embodiments

Although an image generation apparatus and a learning system according to one or a plurality of aspects of the present disclosure have been described above on the basis of the embodiments, the present disclosure is not limited to the embodiments. The one or plurality of aspects of the present disclosure may include modes obtained by modifying the embodiments in various ways conceived by those skilled in the art and modes constructed by combining components in different embodiments, insofar as the scope of the present disclosure is not deviated from.

Although RGB intensity information is used as color information in the above embodiments, for example, the color information is not limited to intensity information. For example, the first image 11 and the second image 12 may be represented by a color model other than the RGB color model, and information according to the color model may be used as color information. More specifically, if the first image 11 and the second image 12 are represented by a hue, saturation, and intensity (HSI) color model, for example, information regarding hue, saturation, and intensity may be used as color information. Alternatively, if the first image 11 and the second image 12 are represented by a YUV color model, for example, information regarding luminance and color differences may be used as color information.

Although the first image 11 is a foreground image and the second image 12 is a background image in the above embodiments, the first image 11 and the second image 12 are not limited to this. For example, the first image 11 may be a background image, and the second image 12 may be a foreground image, instead. That is, the background image may be converted. In addition, a combination method is not limited to superimposition. For example, the converted first image 11 and the second image 12 may be combined with each other side-by-side.

In addition, part or all of the components of the image generation apparatus according to each of the embodiments may be included in a single system large-scale integration (LSI) circuit. For example, the image generation apparatus 110 may be a system LSI circuit including the obtaining unit 111, the calculation unit 112, the conversion table storage unit 113, the conversion unit 114, and the image generation unit 115.

The system LSI circuit is a super-multifunctional LSI circuit fabricated by integrating a plurality of components on a single chip. More specifically, the system LSI circuit is a computer system including a microprocessor, a read-only memory (ROM), and a random-access memory (RAM). A computer program is stored in the ROM. When the microprocessor operates in accordance with the computer program, the system LSI circuit achieves functions thereof.

Although the term "system LSI circuit" is used here, a term "integrated circuit", "LSI circuit", "super LSI circuit", or "ultra LSI circuit" may be used, instead, depending on a degree of integration. A method for fabricating an integrated circuit is not limited to LSI, but a dedicated circuit or a general-purpose processor may be used, instead. After an LSI circuit is fabricated, a field-programmable gate array (FPGA) capable of performing programming or a reconfigurable processor capable of reconfiguring connections and settings of circuit cells inside the LSI circuit may be used.

Furthermore, if a technique for fabricating an integrated circuit that replaces LSI appears as a result of evolution of semiconductor technologies or a derivative technology, function blocks may be naturally integrated with one another using the technique. Application of a biological technique is one of such cases.

In addition, an aspect of the present disclosure may be not only the image generation apparatus but also a method for generating an image in which processing performed by a characteristic component of the image generation apparatus is regarded as steps. In addition, an aspect of the present disclosure may be a computer program that causes a computer to perform characteristic steps included in the method for generating an image. In addition, an aspect of the present disclosure may be a computer-readable non-transitory recording medium storing the computer program.

In the above embodiments, the components may be dedicated hardware or may be achieved by executing a software program suitable for the components. The components may be achieved by a program execution unit, such as a central processing unit (CPU) or a processor, by reading and executing the software program stored in a recording medium such as a hard disk or a semiconductor memory. The software program for achieving the image generation apparatus according to each of the above embodiments or the like is as follows.

That is, the software program causes a computer to implement a method for generating an image used by an image generation system that generates a training image used for machine learning for image recognition. The method includes obtaining an image of a first area included in a first image and an image of a second area included in a second image, calculates a first conversion parameter for converting the image of the first area such that color information regarding the image of the first area becomes similar to color information regarding the image of the second area, converting the first image using the first conversion parameter, and generating a third image by combining the converted first image and the second image with each other.

Also, the method includes obtaining images of a plurality of first areas included in the first image and images of a plurality of second areas included in the second image, calculating a conversion parameter for converting each of the images of the plurality of first areas such that color information regarding each of the images of the plurality of first areas becomes similar to color information regarding a corresponding one of the images of the plurality of second areas, obtaining the first conversion parameter on the basis of the calculated plurality of conversion parameters, converting the first image using the first conversion parameter, and generating a third image as a training image used for machine learning for image recognition by combining the converted first image and the second image with each other.

What is claimed is:

1. A method executed by a processor of the image generation system, the method comprising:

obtaining an image of a first area included in a first image and an image of a second area included in a second image;

calculating a first conversion parameter for converting the image of the first area;

calculating a first error value between a color information regarding the image of the first area converted using the first conversion parameter and a color information regarding the image of the second area;

converting the first image using the first conversion parameter, if the first error value is smaller than a certain threshold; and generating a third image as a training image used for machine learning for image recognition by combining the converted first image and the second image with each other.

2. The method according to claim 1, further comprising:

reducing, if the first error value is equal to or larger than the certain threshold, sizes of the first area and the second area;

obtaining the image of the reduced first area and the image of the reduced second area;

calculating a second conversion parameter for converting the image of the reduced first area calculating a second error value between a color information regarding the image of the reduced first area and a color information regarding the image of the reduced second area; and converting the first image using the second conversion parameter, if the second error value is smaller than the certain threshold, wherein, in the generating, the third image is generated by combining the first image which is converted using the second conversion parameter and the second image with each other, if the error value is equal to or larger than the certain threshold.

3. The method according to claim 2, further comprising:

saving the first conversion parameter; and generating a fourth image, which is different from the third image, as a training image from the saved first conversion parameter, the first image, and the second image.

4. The method according to claim 3, wherein a position or size of the converted image of the first area in the fourth image is different from a position or size of the converted image of the first area in the third image.

5. The method according to claim 1, wherein the error value is an average of differences in pixel values between pixels included in the first area converted using the first conversion parameter and corresponding pixels included in the second areas, and wherein the certain threshold becomes smaller as the sizes of the first area and the second area become smaller.

6. The method according to claim 1, wherein the color information is information regarding at least any of intensity, hue, color differences, and saturation.

7. The method according to claim 1, further comprising:

receiving specification of the first area and the second area from a user.

8. The method according to claim 1, further comprising:

automatically determining the first area and the second area.

9. The method according to claim 8, wherein, in the automatically determining the first area and the second area, person recognition is performed in the first image and the second image and person areas in the first image and the second image are determined as the first area and the second area, respectively.

10. A method for generating an image executed by a processor of the image generation system, the method comprising:
   obtaining images of a plurality of first areas included in the first image and images of a plurality of second areas included in the second image;
   calculating a conversion parameter for converting each of the images of the plurality of first areas;
   calculating first error values each of which is an error value between a color information regarding one of the images of the plurality of the first areas converted using a corresponding conversion parameter and a color information regarding a corresponding one of the images of the plurality of second areas;
   selecting a first conversion parameter which is one of the calculated plurality of conversion parameters, wherein the first error value calculated using the first conversion parameter is the smallest among the first error values;
   converting the first image using the first conversion parameter; and
   generating a third image as a training image used for machine learning for image recognition by combining the converted first image and the second image with each other.

11. A computer-readable non-transitory recording medium storing a program for causing a computer to perform a process comprising:
   obtaining an image of a first area included in a first image and an image of a second area included in a second image;
   calculating a first conversion parameter for converting the image of the first area;
   calculating a first error value between a color information regarding the image of the first area converted using the first conversion parameter and a color information regarding the image of the second area;
   converting the first image using the first conversion parameter, if the first error value is smaller than a certain threshold; and
   generating a third image as a training image used for machine learning for image recognition by combining the converted first image and the second image with each other.

12. An image generation system comprising:
   an obtainer that obtains an image of a first area included in a first image and an image of a second area included in a second image;
   a first calculator that calculates a conversion parameter for converting the image of the first area;
   a second calculator that calculates a first error value between the color information regarding the image of the first area converted using the first conversion parameter and the color information regarding the image of the second area;
   a converter that converts the first image using the conversion parameter, if the first error value is smaller than a certain threshold; and
   an image generator that generates a third image as a training image used for machine learning for image recognition by combining the converted first image and the second image with each other.

13. The method according to claim 1, wherein the third image is generated by superimposing the converted first image upon the second image.

* * * * *